March 18, 1958  L. D. BRAND  2,826,764
AUTOMOBILE BED
Filed Oct. 19, 1953  2 Sheets-Sheet 2

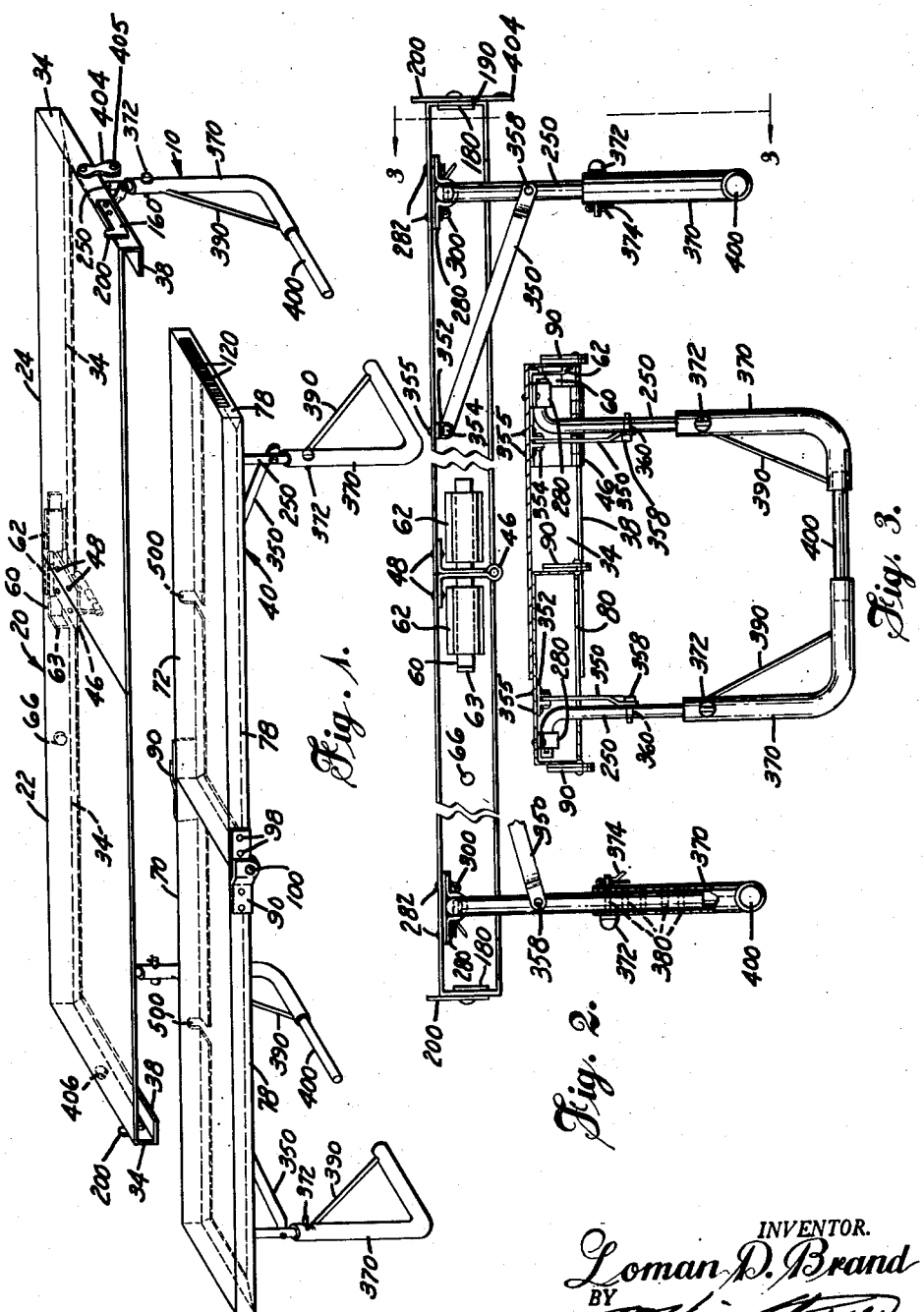

INVENTOR.
Loman D. Brand
BY
Agent

United States Patent Office 2,826,764
Patented Mar. 18, 1958

2,826,764

AUTOMOBILE BED

Loman D. Brand, Omaha, Nebr.

Application October 19, 1953, Serial No. 386,958

1 Claim. (Cl. 5—175)

This invention relates to automobiles and more particularly it is an object of this invention to make it possible to place a child in the back seat of an automobile without danger of a child falling off of the back seat into the large opening between the seats. Many accidents have occurred in this way with children being badly hurt.

Another object of the invention is to provide a device as described which will permit parents to safely place a young child upon the device and upon the back seat for sleeping or play.

Another object is to provide a folding bed device as described the legs of which disappear and are contained in recesses in the top upon folding.

A further object of this invention is to provide means for facilitating sleeping in an automobile.

A particular object is to provide a device for this purpose for filling the space between the seats which is adjustable so as to be extendable for the purpose of adapting to the various spacings of seats in several makes of cars and for the further purpose of adapting to the position of the front seat when the front seat is used by different drivers having longer or shorter legs and still further so as to be adjustable for filling the space between the seats at times when the front seat is disposed as far forward as it can be at maximum, whereby a person can sleep upon the back seat and upon the bed device of this invention with a maximum area available.

Yet a further object is to provide a bed device as described which can be used in or out of an automobile as a table or as a bench.

A particular object is to provide features making possible adjustability of the width of the device without sacrificing the possibilities of folding, and particularly making possible the use of an extension member extending substantially the full length of the bed device.

A further object is to provide a device as described which can fold whereby it can be folded and stored either on one side of the back seat or on the back floor of an automobile or in the trunk compartment.

A further object is to provide recesses in the bottom of the bed for making storage of the legs possible for compact folding.

A further object is to provide a device for this purpose which can be removed from the automobile when desired and when the back seat is needed for normal use.

It is therefore an object of this invention to provide a device for this purpose which is adaptable to be used with older automobiles and to be added to an automobile after manufacture and therefore to be sold as an accessory.

It is well known that there are on the market devices for converting automobiles for sleeping. These devices have been sufficiently costly, however, to have made it impossible to use them on the lower priced automobiles in high mass production.

Other and further objects and advantages of the present invention will be apparent from the following detailed description, drawings and claim, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claim.

In the drawings:

Figure 1 is a perspective view of the automobile bed of this invention showing the extension drawer portion being disjoined from the bench portion.

Figure 2 is a front elevation of the bench portion.

Figure 3 is a view in section taken along the lines 3—3 of Figure 2 having the drawer extension in place.

Figure 4:
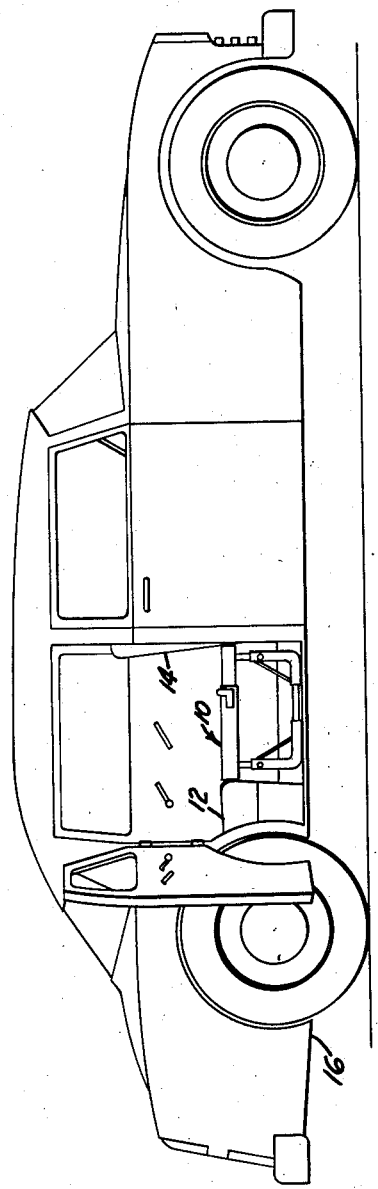
Figure 4 is a side elevation of an automobile with the auto bed placed in position for use between the front and rearward seats of the automobile.

As best seen in Figure 4, the bed of this invention is generally indicated at 10 and is adapted to be placed between the front of a rearward seat 12 and the back of a forward seat 14 of an automobile 16. The bed 10 is comprised of an elongated main supporting portion generally indicated at 20 having two sections 22 and 24 disposed end to end abutting each other along inner edges.

The sections 22 and 24 are preferably of oblong rectangular shape, normally extending with their longest sides transversely of the automobile. Each section has a flat upper surface adapted to be disposed in a horizontal plane during use. Vertical edge sections 34 extend downwardly from the edges of the sections 22 and 24 on the ends and one side of each section leaving the opposite side open for receiving an extension portion later described.

Other portions 38 extend horizontally inwardly a short distance from the horizontal lower edge of the side of the vertical portions 34. Portions 38 on the ends of the sections 22 and 24 serve as tracks or supports for a slidable extension generally indicated at 40 in Figure 1 and later described.

The sections 22 and 24 are secured together by suitable means such as a hinge 46 suitably fixed by rivets or the like 48 to the sections 22 and 24.

The hinge 46 has portions disposed horizontally and fitting against the undersides of the sections 22 and 24 and has two other portions extending vertically downwardly therefrom, one from each of the portions fixed to the sections 22 and 24. The downwardly extending portions of the hinge 46 are adapted to abut each other so as to resist further folding and the vertical sections of the hinge terminate in pin holding portions much like a common door hinge.

The axis of the pin holding portions is horizontal and directly beneath the adjoining edges of the sections 22 and 24. It is preferably spaced sufficiently far beneath the sections 22 and 24 so as to permit the folding of the sections 22 and 24 about the hinge into a folded position, the folding being sufficiently complete that the flat upper portions of the sections 22 and 24 will be disposed in parallelism. For this purpose the axis of the hinge 48 is preferably spaced from the bottom of the horizontal portions of the sections 22 and 24 as the bottom of the track portion 38 is spaced.

In order to further prevent downward bending of the sections 22 and 24 and to add strength, a sliding bar or latch 60 is slidably disposed in holders 62.

The outer end portion of the bar 60 is bent at a right angle whereby a handle member 63 is formed. The handle member 63 extends outwardly and transversely with respect to the inner surface of the vertical side portion 34 of the longer side of the bench portion 22.

The handle member 63 adapts the bar 60 to be moved through the holders 62.

The holders 62 are each fixed to one of the sections 22 and 24 respectively and, when fixed in place, provide an opening thereunder for snugly receiving the bar 60 slidably. In this way, when the bar 60 is in each holder 62, the sections 22 and 24 are rigidly supported. When the bar 60 is removed from one of the holders 62, the sections 22 and 24 can be conveniently folded.

A stop member 66 is shown attached to the inner surface of the longer vertical side portion 34 of the bench portion 22. This stop member 66 prevents the bar 60 from being disengaged from one of the holders 62 while the device is being folded or at times when the device is stored.

It is to be noted that the hinge 46 is spaced inwardly from the adjacent edges 22 and 24 a sufficient distance to provide adequate space for the holders 62 and the bar 60.

The extension portion 40 of the bed is also provided with two portions 70 and 72. The portions 70 and 72 have horizontal upper surfaces of preferably oblong rectangular shape.

The sections 70 and 72 likewise adjoin each other along their inner end edges and have their longer edges disposed transversely of the automobile and of the main supporting section 20.

The portions 70 and 72 have sections 78 extending vertically downwardly a short distance from their outer perimetrical edges and the vertical sections 78 extend preferably all the way around the sections 70 and 72.

The sections 70 and 72 are pivotally secured together preferably by means of hinges 90 disposed on opposite sides thereof and along their adjoining edge. Each hinge 90 can be secured as by means of rivets 98, with one section of the hinge 90 secured to each of the sections 70 and 72. The pin 100 of each hinge 90 is preferably disposed directly beneath the adjoining edges of the sections 70 and 72 and approximately on a line disposed the same distance of the upper surfaces of the sections 70 and 72 as the lower edge of the vertical section 78.

The extension supporting portion 40 is further provided with horizontal portions 80 which extend inwardly a short distance from the horizontal lower edge of the vertical portions 78.

The portions 80 correspond to the inwardly extending horizontal portions 38 of the bench portions 22 and 24 of the main supporting portion 20.

The portions 80 adapt the extension supporting portion 40 to be slid in and out of the main supporting portion 20 on the horizontal track sections 38, as best seen in Figure 3.

The position of the portion 40 in the portion 20 can be fixed through the use of track notches 120 suitably placed in the end ones of vertical sections 78, the rows of notches 120 extending horizontally.

A lock member 160 is fixed to the outer side of the vertical end sections 34 of the supporting sections 22 and 24 and the lock member 160 is preferably formed of resilient material and has a dog 180 extending inwardly therefrom through suitable apertures indicated in dotted lines at 190 in Figure 2. In this way the dogs 180 can engage the notches 120 for holding the extension portion 40 in a desired place.

The lock members 160 are preferably resilient and elongated and have that end which is opposite the dog 180 fixed to the sections 22 and 24. Nibs 200 extend upwardly from the lock members 160 beyond the top of the sections 22 and 24 for convenient handling to release the locks 160.

Again referring to Figure 3 it will be seen that the hinge 46 is preferably short in length for the purpose of clearing the extension portion 40 when that portion is adjusted to its maximum inwardly adjustable position.

The supporting sections 20 and 40 are upheld by leg means and preferably include a plurality of vertical posts 250 disposed one at each corner of the assembly. The posts 250 have upper ends which are bent into horizontal position and are received in suitable post holding fittings 280 which pivotally attach the upper ends of the posts 250 to the undersides of the respective corners of the horizontal parts of the portions 20 and 40. The fittings 280 are secured to the underside of the portions 20 and 40 preferably by rivets 282. Cotter pins 300 hold the posts 250 in place.

The posts 250 are maintained in a vertical position at desired times by means of braces 350 which are suitably secured by brackets 352 to the undersides of the respective horizontal portions 22 and 24, 70 and 72.

The upper ends of the braces 350 are pivotally secured within U-shaped brackets 352 by means of pins 354. The brackets 352 are rigidly secured to the undersides of the portions 20 and 40 by suitable means preferably rivets 355.

The brackets 352 are disposed inwardly of the respective posts 250 toward the center of the portions 20 and 40 respectively whereby the braces extend outwardly and downwardly. Each brace 350 is provided with a pin 358 fixed to the lower end thereof and extending inwardly toward the respective post 250. Each post 250 has an aperture 360 therethrough for receiving a pin 358 whereby the brace 350 can be readily removed from the post 250 by pulling the pin 358 out. Each pin 358 is permanently fixed to its brace 350.

At the lower end of each post 250 is an elongated annular sleeve or lower leg portion 370. The portions 370 are preferably of an L-shape extending vertically and horizontally inwardly toward an opposite corner of a corresponding end of the bed.

Suitable means such as bolts 372 and cotter pins 374 can be used to extend through a suitable horizontal aperture in the upper end of the vertical portion of each lower leg 370 and through a suitable one of a plurality of vertically spaced apart apertures 380 extending through each post 250. In this way, the effective height of each leg can be regulated.

Suitable rods 400 connect the inner ends of the lower leg portions 370 by being telescopically received in each of two corresponding lower leg portions 370.

Braces 390 can be suitably secured diagonally across the L-shaped lower leg sections 370 if desired.

A locking means preferably a leather strap 404 is provided for holding the device in a folded position. The strap 404 has one end riveted, buttoned or otherwise secured to the outer surface of the vertical end portions 34 of the bench portion 24. The opposite end of the strap is provided with a button hole or preferably the female portion of a snap fastener, the male portion of the fastener 406 being secured to the vertical end portion 34 of the opposite bench portion 22.

As thus described it will be seen that the automobile bed of this invention may be used in conjunction with an automobile, as illustrated in Figure 4, or may be removed from the auto to be used as a bench or table.

When it is desired to fold the bed, the braces 350 can be disengaged from the leg posts 250 by springing the brace 350 away from the posts 250 thereby pulling the pins 358 out of the aperture 360.

The braces and legs can then be folded against the undersides of the horizontal portions of the supporting sections 22, 24, 70 and 72 respectively, the normally horizontal portions of the legs being received in notches 500 provided in the forward edges of the extension supporting section 40.

The notches 500 facilitate the legs being stored flat against the undersides of the main supporting section 20 and the extension supporting section 40 respectively.

The sliding bar is moved outwardly from one of the holders 62 and engages the stop member 66, thereby allowing the entire unit to be folded.

The snap fastener 404 and 406 is then engaged and the leather strap 404 holds the now compact unit in a position for storage or easy handling.

From the foregoing description, it is thought to be obvious that an automobile bed constructed in accordance with my invention is particularly well adapted for use, by reason of the convenience and facility with which it may be assembled and operated, and it will also be obvious that my invention is susceptible of some change and modification without departing from the principle and spirit thereof, and for this reason I do not wish to be understood as limiting myself to the precise arrangement and formation of the several parts herein shown in carrying out my invention in practice, except as claimed.

I claim:

A bed adapted to be placed between the front of a rearward seat and the back of a forward seat of an automobile, said bed comprising an elongated upper main supporting portion having two sections disposed end to end and adapted to extend transversely of said automobile, said sections having substantially flat upper surfaces disposed in a horizontal plane during use, means pivotally securing said sections together whereby they are adapted to fold into positions substantially along side each other in parallelism, and means for preventing said sections from bending downwardly at their abutting ends out of the horizontal position, an extension supporting portion, said extension supporting portion having two sections having upper surfaces substantially horizontally disposed in use positions, said two extension sections each being elongated and adapted to extend transversely of the automobile, means pivotally attaching the abutting ends of said extension sections together whereby they are adapted to be pivoted into positions such that said sections are disposed in substantial parallelism for compact storage, means for preventing said extension sections from pivoting downwardly at their abutting ends beyond substantially a horizontal position in use, said main supporting sections being constructed for receiving said extension slidably thereunder for sliding movement transversely of said main portion whereby the upper surface of said extension portion is substantially continuous with the upper surface of said main portion, leg means for supporting said main portion and said extension portion, said leg means being foldably attached, said leg means including: an upright portion at each corner of the bed respectively, two of said upright portions being attached at opposite ends of said main body portion, another two of said upright portions being attached at opposite ends of said extension portion, means adjustably interconnecting the lower ends of those upright portions disposed at one end of said bed and means adjustably interconnecting those upright portions disposed at the opposite end of said bed, said extension portion having a downwardly extending flange portion along the inner edge thereof facing said main supporting portion, said flange having two notches therein, one of said notches being disposed in one of the sections of said extension supporting portion, and the other of said notches being disposed in another of the sections of said extension supporting portion, said notches being disposed in positions for respectively receiving the interconnecting means which interconnects the respective upright portions of the respective end of said bed, whereby said bed can be folded at times when said extension supporting portion is disposed at least partially within said main supporting portion for compact storage as one unit.

References Cited in the file of this patent

UNITED STATES PATENTS

| | | |
|---|---|---|
| 1,631,620 | Carrigan | June 7, 1927 |
| 1,905,282 | Hatfield | Apr. 25, 1933 |
| 2,468,253 | Dean | Apr. 26, 1949 |
| 2,490,889 | Stallard | Dec. 13, 1949 |
| 2,556,121 | Thomas | June 5, 1951 |
| 2,631,304 | Brockmier | Mar. 17, 1953 |
| 2,696,246 | Putnam | Dec. 7, 1954 |